United States Patent [19]
Logue

[11] 3,803,574
[45] Apr. 9, 1974

[54] VEHICLE WHEEL SLIPPAGE CONTROL SYSTEM

[76] Inventor: George E. Logue, 321 Winters Ln., Montoursville, Pa. 17754

[22] Filed: May 25, 1972

[21] Appl. No.: 256,783

[52] U.S. Cl.............. 340/268, 37/DIG. 1, 73/507, 172/2, 340/52 R, 340/271
[51] Int. Cl.......................... B60t 8/10, G08b 21/00
[58] Field of Search.................. 340/268, 271, 52 R; 73/507; 116/115; 37/DIG. 1; 172/2

[56] References Cited
UNITED STATES PATENTS

| | | | |
|---|---|---|---|
| 2,654,301 | 10/1953 | Bohmker | 37/DIG. 1 |
| 2,153,264 | 4/1939 | McNeil | 340/268 |
| 2,399,685 | 5/1946 | McCoy | 73/507 |
| 2,927,649 | 3/1960 | Poynor et al. | 172/2 |
| 3,064,371 | 11/1962 | Kutzler | 37/DIG. 1 |

Primary Examiner—John W. Caldwell
Assistant Examiner—Glen R. Swann, III

[57] ABSTRACT

In an earth moving vehicle having rotary tractive elements for propelling the vehicle and idler elements rotating at the ground velocity, a sensor is provided on each and a differential transmission responsive to the sensors produces an output signal indicating an adjustable predetermined level of excess speed of said tractive elements over said idler elements. The differential transmission is a comparator of the two speeds and is infinitely variable and adjustable even during operation for more or less slippage allowed. Specifically, in the transmission, idler discs, rotatable supported on a housing, are engaged by two input shafts for opposite direction rotation and upon excess speed ratio being denoted, the housing rotates. A cam carried by the housing operates microswitches, first for a warning and second for actuating disabling means for the vehicle. A one-way clutch interconnecting the housing and cam allows a predetermined ratio of speeds for continuous non-slip or limited slip operation of the tractive elements. The sensors include orbiting magnet segments on the tractive and idler elements for periodically operating proximity switches. Stepping motors responsive to said switches turn the input shafts of the transmission in proper proportions. Reset of the system may be obtained by separate driving of the stepping motor coupled to said idler elements.

17 Claims, 5 Drawing Figures

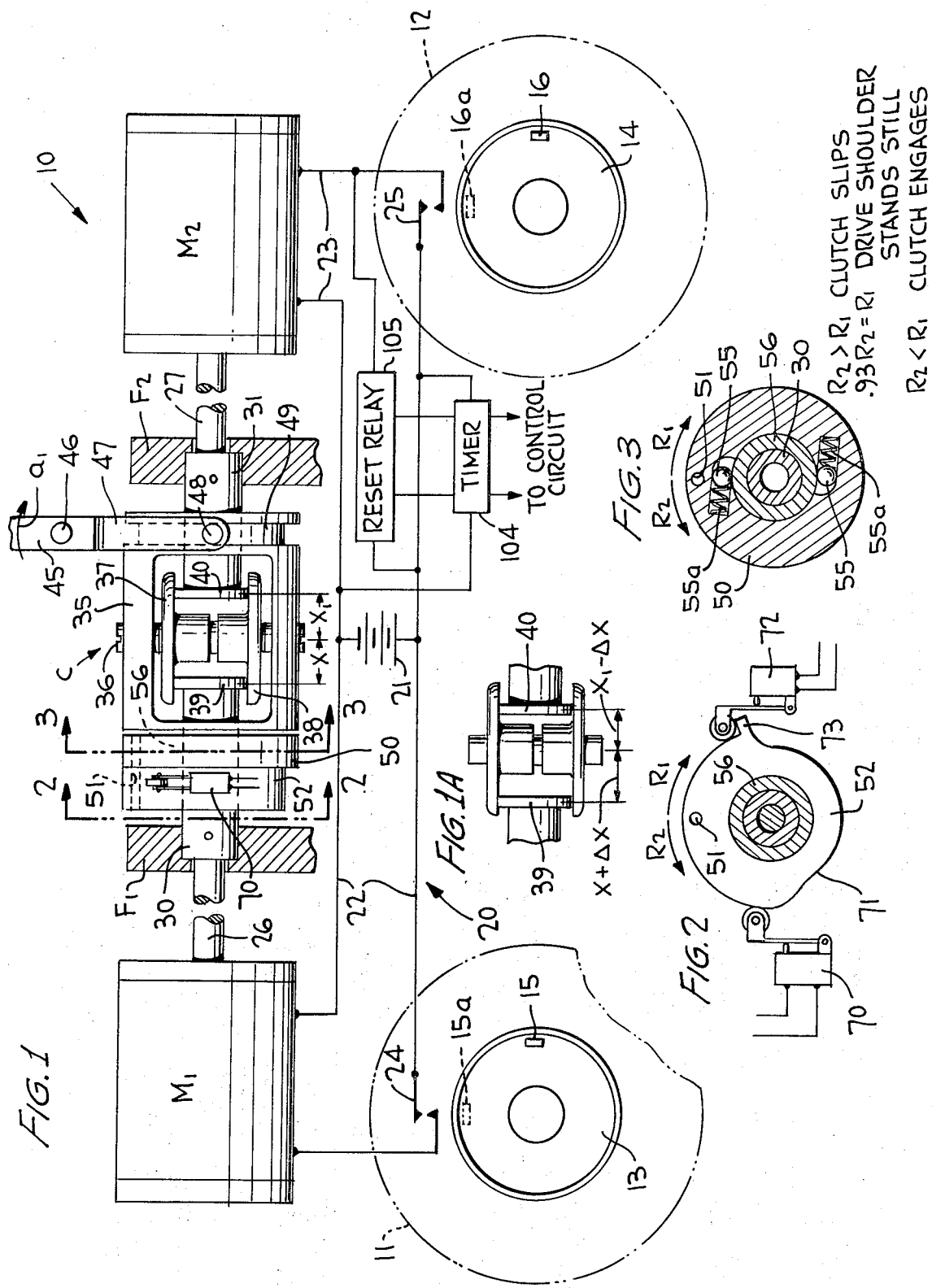

VEHICLE WHEEL SLIPPAGE CONTROL SYSTEM

BACKGROUND OF THE INVENTION

The present invention relates to vehicles, such as large earth moving vehicles, and more particularly to improvements in control systems for preventing excess slippage of the drive wheels of such a vehicle.

In the earth moving and earth working fields, it has long been recognized that the use of rubber tired wheels is preferred over metal tracks or wheels in order to allow the vehicle free access to paved roads and other surfaces. Further, rubber tired wheels are recognized as being beneficial to the longer life of the off-the-road equipment since much of the driving shock and jolts are absorbed by the tires. Also, of course, the operator is able to drive a vehicle faster and with less fatigue when the vehicle has the resilient support rather than the metal tracks or wheels.

The overriding problem of utilizing rubber tired wheels on large equipment in the past, has been that the tires are highly susceptible to wear when a slipping condition exists between the tire and the ground. Completely eliminating the chances of slipping in the vehicles in this nature is impossible for all practical purposes since the maximum pulling force must be applied to the wheels when a load is being picked up or grading operations are being carried out. To get maximum efficiency from the equipment, the maximum torque to the wheels must be applied and maintained just up to the point where the limit of frictional engagement is reached. This limit of course varies with each vehicle, the skill of the driver, the climactic conditions and the nature of the soil or the material being worked in so that the equipment cannot be fitted with a torque limiting governor. On the other hand, the equipment cannot be left without some overriding control with respect to the operator since the tires of the vehicle under certain conditions can be literally ripped to shreds by allowing the wheels to slip excessively during its operation.

In the past, alternatives to using steel tracks or wheels on earth moving equipment have ranged from providing more highly trained and reliable operators to providing control systems on the vehicle for sensing and limiting the torque and/or slippage that can occur in the drive wheels. The control systems have shown the most promise for an effective solution and ranged from relatively simple combinations, such as shown in the U. S. Pat. No. to Poynor et al. 2,927,649, issued Mar. 8, 1960, to highly sophisticated and expensive electronic systems responsive to a variety of input parameters, as shown by the U. S. Pat. No. Kutzler 3,064,371, issued Nov. 20, 1962. While these prior systems have proven to be feasible, they have not gained wide acceptance in the field because of several basic drawbacks. The systems, both the relatively simple and the highly complicated systems, have suffered from problems of accuracy and reliability in actual use. Also, because of the nature of the construction of the systems, they have lacked the necessary versatility to make the same desirable on a vehicle that must operate under variable conditions, as well as the versatility needed for allowing one basic system to be adapted for the full range of earth moving equipment. The versatility and accuracy of operation has never been able to be built into a system utilizing simple, low cost and reliable components that brings with it the acceptance necessary for a successful control system of this type.

OBJECTIVES OF THE INVENTION

Accordingly, it is one object of the present invention to provide an improved control system for an earth moving vehicle that is highly versatile and basically sound in design for wide acceptance in the vehicle art.

It is another object of the present invention and related to the above-mentioned object to provide a control system with improvements that weigh in favor of greater reliability, lower cost and acceptable for efficient operation of the vehicle by the operator.

It is still another object of the present invention to provide a control system utilizing a differential transmission means responsive to motors actuated in response to the turning of a drive wheel and an idler wheel, such transmission means having motion converted first to warning and then, if continued, to disabling signals.

It is still another object of the present invention to provide such a transmission means defined by the above object that can be utilized in other environments to efficiently sense and cause a response to a preselected ratio of differential speeds between two drive members.

SUMMARY OF THE INVENTION

The control system of the present invention is designed for use on an earth moving vehicle having at least one rotary tractive means for propelling the vehicle and one idler means that is constantly rotating at the ground velocity of the vehicle. The heart of the control system is a differential transmission means that compares the rotative speed of the driving wheel with the speed of the idler wheel. When the ratio of these speeds exceeds a predetermined level, suitable automatic reaction or utilization means is brought into play. The transmission means provides a rugged and simple comparator and one that can be simply adjusted, even during operation if authorized. The control system is adaptable to a wide variety of conditions and to essentially all different types and sizes of vehicles.

Briefly, the comparator or differential transmission means includes idler disc means rotatably supported on a housing that is free to bodily rotate. At least two input shafts for opposite direction rotation provide the driving input from the drive wheel and idler wheel, respectively. The idler discs are rotated by frictionally engaged drive discs on the drive shafts. When a predetermined ratio between the rotation of the drive wheel as compared to the idler wheel is reached, the housing turns thereby activating a warning circuit, and then upon continuation of the undesirable slippage, a disabling circuit that actually stops the vehicle beyond the operator's control. For greatest reliability, the input shafts are driven by stepping motors that are pulsed by proximity switches in the motor circuit, said switches being responsive to magnet segments mounted on the respective wheels for orbiting movement. The simplicity of the comparator and the absence of mechanical interconnection between the comparator and the wheels provides results and advantages not heretofore gained in the prior art, as represented by the patents cited above.

The detecting means for generating the output signal in response to the comparator, which it will be recalled is indicative of exceeding a predetermined ratio speed of rotation of the drive and idler wheels, preferably takes the form of a simple cam device interconnected to the housing with the cam being engaged by a first microswitch in the warning circuit and a second microswitch in the disabling circuit. A one-way clutch is interposed between the cam and the rotatable housing so that a built-in percentage of slip of the drive wheel, such as a seven percent slip, can be built into the system in order to allow efficient operation of the vehicle. In this regard, it should be noted that slipping the drive wheels a limited amount is inherently necessary or desirable in order to insure that the maximum torque is being applied. Up to a limited point, such as the seven percent point, the operator can successfully operate the vehicle without undue wear on the tires. The one-way clutch is, thus in effect, a device for allowing continuous rotation of the housing in a reverse direction up until the point of the predetermined slippage is reached. If on the other hand, the vehicle is desired to be operated with more, less or without any slippage, the housing need merely be adjusted to relocate the drive discs at different radial positions on the idler discs.

The warning and disabling circuits may be provided with visual as well as audible means for indicating to the operator when the selected threshold ratio is reached. A counter may be added to the warning circuit and used as a guage of the operator's proficiency and/or for an indicator of the tire wear of the drive wheels. Automatically responsive means, such as a hydraulic cylinder lift for the working implement of the vehicle and hydraulically operated brakes may be interposed in the warning and disabling circuits, respectively, in order to assist or actually take over the corrective operations that must be performed by the operator in order to reestablish the "go" condition to the system. A reset circuit is provided to allow the operator to bring the vehicle back into the operative condition when necessary.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a schematic diagram of the control system of the present invention showing in detail the comparator or transmission means used in the same;

FIG. 1A is a schematic view of the interacting discs of the comparator showing an adjusted position that allows limited slip of the drive wheel;

FIG. 2 is a cross-sectional view taken along line 2—2 of FIG. 1 showing the cam for detecting variance from the predetermined ratio of wheel rotation;

FIG. 3 is a cross-sectional view taken along line 3—3 of FIG. 1 and showing the one-way clutch that allows interposing of an acceptable limited slippage value.

DETAILED DESCRIPTION OF THE PREFERRED EMBODIMENT

Figure 4:
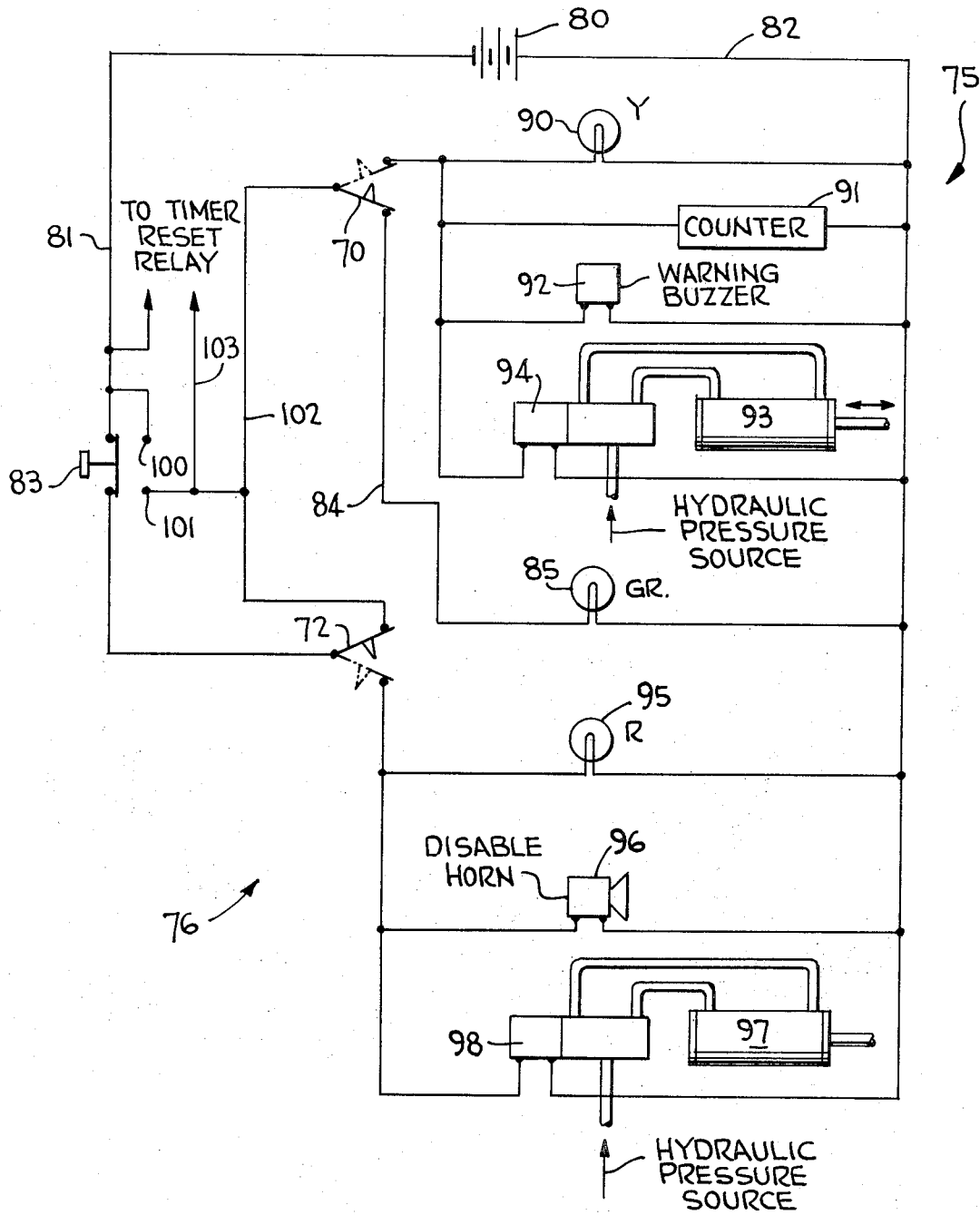
FIG. 4 is a schematic view illustrating the combined warning and disabling circuits used in conjunction with the system of FIG. 1.

The invention can be more fully understood by presenting a more comprehensive analysis of each of the elements that make up the novel control system and the novel comparator of the present invention. Thus, in FIG. 1, the overall control system, generally delineated by the reference numeral 10, is suitably interconnected with an driver wheel and a idler wheel of a vehicle (not shown), which wheels are delineated by dot-dash outline and identified by reference numerals 11 and 12, respectively. The drive and idler wheels may be positioned at any relative location on the vehicle. It is to be further understood that in accordance with the broadest aspects of the invention that the control system 10 may be utilized with virtually any type of vehicle, such as a bulldozer, front end loader, earth movers with scoop-like carrying pans and road graders, as well as any other tractor or pulling device that is utilized in a similar manner.

Each of the wheels 11, 12 have mounted thereon suitable sensor discs 13, 1 mounted for rotation with the respective wheels. Each of the sensor discs 13, 14 preferably includes one or more magnet segments 15, 16, respectively, that are used in accordance with the invention as transducers to indicate the rotation of said wheels 11, 12, as will be seen presently.

The control system 10 includes a pair of stepping devices or motors $M_1$, $M_2$ that are driven by a motor circuit, generally represented by the reference numeral 20, and including a voltage source 21 connected to the motors $M_1$, $M_2$ by suitable pairs of leads 22, 23. One of the leads 22, as well as one of the leads 23 has a proximity switch 24, 25, respectively, for each of the motors $M_1$, $M_2$. The proximity switches 24, 25 are responsive to the periodic positioning of the magnets 15, 16 during orbiting movement about the wheel axis to the respective dotted line positions 15a, 16a. In effect, it can be considered for illustrative purposes that the upper contact is attracted and drawn downward into engagement with the lower contact, thereby completing the respective side of the motor circuit 20. It can be realized thus far that if the drive wheel 11 and the idler wheel are rotating at the exact same velocity, that the motors $M_1$, $M_2$ will be pulsed in the same direction by exactly the same amount as the vehicle moves over the ground. Since the motors $M_1$, $M_2$ are facing in opposite direction with opposed drive shafts 26, 27, these drive shafts are then in effect rotating in opposite directions at the same speed.

Suitable frame members $F_1$, $F_2$ may be provided on the vehicle and serve to rotatably support first and second drive members 30, 31 mounted on respective drive shafts 26, 27. The drive members 30, 31 serve as inputs to a comparator or differential transmission means C that is built in accordance with one important aspect of the present invention, and which serves as the heart of the improved control system 1 of the present invention.

The comparator C includes an outer housing 35 which is mounted for free rotation with respect to the supporting drive members 30, 31. Fixed on the housing 35 is a supporting cross shaft 36 having rotatably mounted thereon first and second idler rotary discs 37, 38. These discs thus are positioned with their axis of rotation transverse to the axis of rotation of the drive members 30, 31 and engage on their inside operative surfaces, a pair of friction drive discs 39, 40 formed on said drive members 30, 31. Thus, upon actuation of the motors $M_1$, $M_2$ the drive wheels 39, 40 impart counter rotating movement to the idler discs 37, 38.

Viewing FIG. 1, the operation of the comparator or transmission means C can be now described. With the housing 35 positioned as shown in this figure with the friction drive discs 39, 40 at the same distance X, $X_1$ from the axis of the cross shaft 36, equal and opposite rotations of said drive discs 39, 40 will result in equal and opposite reaction tending to rotate the housing 35. The equal and opposite rotations of the frictional discs 39, 40 results from the drive wheel 11 of the vehicle and the idler wheel 12 operating at the same rotational speed. This condition could be maintained at times that the vehicle is operating under abnormal condition, such as, when the vehicle is exclusively on hard pavement or on a rocky bed, where even the slightest slippage of the drive wheels would be highly deleterious to the tread of the tire. When the slightest slippage would occur with the discs 37–40 set as in FIG. 1, a warning signal would be activated since the housing 35 would rotate generating an output signal.

The axial position of the comparator C may be adjusted in order to vary this relationship between the discs 37–40 so that, in fact, a certain amount of slippage may occur, as is more desirable. This is important since an earth moving vehicle is usually operating on the bare earth where the force needed to obtain a load inherently causes some slippage of the drive wheels of the vehicle, and maximum torque is desired, as explained above. The adjustment of the housing 35 is preferably accommodated by moving a lever 45 that is pivotally mounted at a pivot point 46, as shown in FIG. 1. This lever may be controlled by the operator from the cab of the vehicle and adjustment of the axial position may take place even during operation of the vehicle and the system 10. The lever has a yoke portion 47 having pins 48 at the open end thereof engaging a circumferential slot 49 extending around the full periphery of the housing 35.

Thus, under more normal operating conditions, the lever 45 would be pivoted to the right, as viewed in FIG. 1 and as shown by the arrow $a_1$, in order to shift the housing 35 and with it the idler discs 37, 38 to a new position, such as shown in FIG. 1A. In this mode, the drive disc 39 is located a longer distance $X=\Delta X$ from the axis of the cross shafts 36 and the drive disc 40 is located a shorter distance $X1-\Delta X$. Now, as the drive discs 39, 40 rotate, the drive disc 40 will have more of an influence on the bodily rotation of the housing 35. This is because the drive disc 40 is now operating at a smaller radius thereby causing the discs 37, 38 to rotate faster for a given speed of the drive disc 40. By the same token, the drive disc 39 is located at a greater radial distance so that more revolutions are necessary in order to impart a single revolution to the idler discs 37, 38. In this condition, if the motor $M_1$ is operating faster than the motor $M_2$ by a percentage exactly determined by the amount $2\Delta X$, then the housing 35 remains still and there is no output signal generated. However, if the motor $M_1$ exceeds this predetermined amount as set by the adjustment of the lever 45 and thus crosses the threshold ratio, then the drive disc 40 gains a greater influence in stepping the housing 35 around thereby causing an output signal to be generated through a detecting means yet to be described.

The basic operation of the comparator C can be perhaps more clearly understood if one considers what happens when one of the drive discs 39, 40 is held stationary and the other disc is rotated. For example, in viewing FIG. 1 of the drive disc 40 is held stationary and the drive disc 39 is rotated, the discs 37, 38 walk around the outer periphery of the disc 40 and as the discs walk, the motion is imparted through the cross shaft 36 to the housing 35. The housing 35 moves in the same rotational direction as the wheel 39 being driven. Since the housing 35 is mounted for rotation on the drive members 30, 31, the frictional interengagement between the drive member 30 and the supporting bore of the housing 35 assists in this same direction rotation. Now once the drive disc 40 starts to rotate in the opposite direction, this walking action of the discs 37, 38 is offset until the point is reached wherein the forces are equal and opposite or synchronized, and the housing 35 then remains at a standstill. If the speed of the disc 40 could overtake the disc 39, then the housing 35 would start rotation in the opposite direction.

Moving on to discuss the detecting means to sense this bodily rotation of the housing 35 that is used as the output signal, a one-way clutch 50 is mounted at the lefthand end of the comparator C, as viewed in FIG. 1. This clutch is, in turn, connected by a suitable shear pin 51 to an operating cam member 52. As the housing 35 rotates, as described above, the cam 52 will thus be rotated in a desired direction for an output signal.

Considering the mode of adjustment of FIG. 1A, as long as the drive disc 40 is rotating faster than, equal to or only a fixed percentage (such as 7 percent) less than the drive disc 39, the housing 35, the one-way clutch 50 and the cam 52 will be operating in one direction, which is shown by the arrows $R_2$ in FIGS. 2 and 3. At the threshold rotational ratio where the drive disc 39 is rotating a set percentage, say 7 percent, above the rotational speed of the drive disc 40, then the housing 35, the one-way clutch 50 and the cam 52 are held stationary. As the threshold ratio is surpassed by a greater rotation of the drive disc 39 indicating more than the desirable slippage of wheel 11, then the parts rotate in the opposite direction shown, by arrows $R_1$, whereupon output signal are generated, as will be seen.

The structure of the one-way clutch 50 may be of any conventional design, such as with balls 55 that are spring biased into engagement with mounting shoulder 56 of the housing 35 (see FIG. 3). In operation, when $R_2$ is greater than $R_1$, that is when the motor $M_2$ is the adjusted dominant driving force, the housing 35 and the shoulder 56 rotate free with the balls 55 being forced against the springs 55a, thereby preventing turning of the clutch member 50 if there is at least a light holding force applied thereto. On the other hand, when the motor $M_1$ is in an overriding condition or with the ratio more than the predetermined set amount, such as seven percent, the clutch 50 engages immediately and causes rotation in the direction $R_1$.

Through the shear pin 51, the cam 52 of FIG. 2 is rotated in the same direction of rotation $R_1$, $R_2$ as the clutch 50. To sense this rotation and thus to ultimately provide the detecting function, first microswitch 70 is provided. This gives the first output signal in response to the condition of rotation $R_1$ of the housing 35 of the comparator C. A reduced portion or land 71 of the cam 52 causes a switching of that switch. As the direction of rotation of the cam 52 continues, the reduced land 71 finally comes into position for operation of microswitch 72 that gives a still further output signal of the system.

As shown in FIG. 2, when the clutch 50 is rotating in the opposite direction $R_2$, the cam 52 returns to its initial position shown in FIG. 2. A radially extending stop 73 serves to provide the light holding force to stop the cam 52 at this point and further rotation is prevented by slippage of the ball members 55 in the one-way clutch 50. The first microswitch 70, which is to be actuated substantially as soon as the predetermined ratio has been exceeded, may constitute a warning signal, as will be discussed in conjunction with a warning circuit 75, shown in FIG. 4. The second microswitch 72 may constitute a disabling switch, which will be also further discussed in conjunction with a corresponding disabling circuit 76, also shown in FIG. 4.

The warning and disabling circuits 75, 76 may be supplied from a common potential source 80 with leads 81, 82. A reset switch 83, the second microswitch 72 and the first microswitch 70 are connected in series and through a lead 84 activate a light indicator 85 that depicts a green or "go" condition of the system 10. As long as the drive wheel 11 of the vehicle is maintained within the predetermined speed to give a suitable slippage ratio, the indicator 85 will be maintained on. During this time, the housing 35 will be rotating in the direction $R_2$ with the balls 55 allowing the movement or standing still.

Now assuming that the operator has operated the vehicle such as to exceed the predetermined ratio of slippage and the clutch 50 passes through the stop condition and starts to rotate in the opposite direction $R_1$ the cam 52 is immediately rotated in the same direction $R_1$ whereupon the feeler of the first microswitch 70 senses the reduced portion 71 of the cam. The switch 70 thus switches from the full line to the dotted line position of FIG. 4. Immediately, the circuit to the indicator 85 is interrupted and yellow visual indicator 90 of the warning circuit 75 is activated on the operator's control board. At this point, the operator should take corrective action by reducing the power to the drive wheel 11 of the vehicle and if he does so the opposite rotation $R_2$ is quickly reinstated and the cam 52 returned to the home position to again activate the green indicator 85.

Also included in the warning circuit 75 is a counter 91, that can be of conventional design and may be used for a number of purposes. The counter since it is wired in parallel with the indicator 90 records each time the operator has allowed excess slippage of the wheels to occurs. An accurate record of the proficiency of his performance as an operator is thus obtained. Furthermore, the counter 91 may be utilized as a tire wear indicator, since experience has shown that the amount of slippage has a direct bearing on the amount of tire wear that is encountered. An audible indicator or warning buzzer 92 may also be supplied in the warning circuit 75.

Finally, a hydraulic cylinder 93 fed through a solenoid operated valve 94 may also be wired in parallel in order to provide an automatic function output when the system is in the warning mode. The cylinder 93 may serve to raise the pan of a vehicle, reduce the throttle or any other like function that would immediately and independently of the operator bring the vehicle back into the proper operating mode.

In the event that the operator does not make the correction and/or the cylinder 93 is unable to correct the condition automatically, the second microswitch 72 will finally be brought into engagement with the reduced portion 71 whereupon this switch is moved to the dotted line position, also shown in FIG. 4. Red light 95 and disable horn 96 are activated in the disabling circuit 76 as a result of this repositioning of the second microswitch 72. An automatic function operator cylinder 97 responsive to solenoid 98 can disable the vehicle, such as by opening the throttle and applying the brakes, or in any other suitable way. Once the disabling circuit 76 is brought into operation by the microswitch 72, the operator must operate the reset button 83 in order to get the vehicle under way again.

When the reset button 83 is so operated and thus removed from its contacts along the lead 81, the disabling circuit 76 is reopened so that there can be movement of the vehicle. A second set of contacts 100, 101 are provided in a reset circuit which through lead 102 maintains the yellow condition warning still in effect during reset. Also, through lead 103 a timer 104, shown in FIG. 1 of the drawings, is activated and operates a reset relay 105 for a predetermined length of time. This bypasses the proximity switch 25 and operates the motor $M_2$ independently of rotation of the idler wheel 12. This independent operation of the motor $M_2$ in effect causes the drive disc 40 to overrun the disc 39 to offset rotation of the housing 35 back in the direction $R_2$ until the initial or home position of the cam 52 is reached. When this happens both the microswitch 70 and the microswitch 72 are repositioned in their initial "go" condition of FIG. 4.

In summary, a highly efficient and reliable control system for an earth moving vehicle has been provided utilizing a comparator or differential transmission means that gives new efficiencies and results. The comparator is capable of infinite adjustment even during operation, and is adapted by design to be suitable for virtually any type vehicle or any range of allowable slippage. The system is highly sensitive to changes to assure proper monitoring of the ratio to accomplish its purpose of saving the vehicle tires of excessive wear or destruction. Yet the system is versatile enough to give the operator sufficient warning before disabling the vehicle so that he can still operate efficiently if he is skilled and conscientious. The sensors for the system utilize proximity switches and magnets that obviate any direct interconnection with the wheels of the vehicle, and the stepping motors $M_1$, $M_2$ responsive thereto provide the required inputs to the comparator C.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. In a control system for an earth moving vehicle having rotary tractive means for propelling said vehicle, and idler means rotating at the ground velocity of said vehicle, the improvement comprising first and second sensing means for generating first and second signals indicative of the speed of said tractive and idler means, respectively, first and second rotary motor means driven in response to said signals, first and second drive members on respective ones of said motor means, differential transmission means for sensing the difference in speed of rotation of said drive members, detecting means for generating an output signal in response to said differential transmission means indicative of exceeding a predetermined ratio of speed of rotation of said first member compared to the speed of rotation of said second member, means for adjusting said differential transmission means to allow greater or less ratio indicative of more or less slippage of said tractive means, and utilization means responsive to said output signal for signaling the condition of exceeding the predetermined ratio, whereby corrective action may be taken to reduce the slippage of said tractive means with respect to said idler means.

2. The control system of claim 1 wherein said motor means comprises electrical stepping motors, in combination with a motor circuit comprising a source of voltage for said motors and wherein said sensing means includes electrical switch means in the motor circuit for operating said stepping motors in response to the turning of the respective tractive and idler means.

3. The control system of claim 2 wherein said electrical switch means comprise proximity switches mounted adjacent the respective tractive and idler means and magnet segments mounted on said tractive and idler means for intermittently operating said switches to drive said stepping motors in proportion to the turning of said tractive and idler means.

4. The control system of claim 1 wherein said drive members have opposed shafts, and wherein said differential transmission means comprises a housing rotatably mounted relative to said shafts, idler rotary disc means mounted on said housing having drive face means engaging the periphery of said drive members for rotation in response to said drive members, the axis of rotation of said disc means being transverse to the axis of said shafts and wherein said adjusting means comprises means for relatively shifting said housing with respect to said drive members to position the latter at adjusted radial positions along the face of said disc means, whereby preselected conditions of differential speeds of opposite rotation between said shafts may be selected.

5. The combination of claim 4 wherein said adjusting means further comprises a circumferential slot formed in said housing and an adjustment lever having a yoke portion fitted in said slot for shifting said housing with respect to said drive members.

6. The control system of claim 1 wherein said detecting means includes a one-way clutch connected to said differential transmission means, whereby overrunning action may occur in response to rotation of said first member at the same speed or only slightly greater speed than the rotation of said second member.

7. The control system of claim 6 wherein said detecting means further comprises a cam, and means for interconnecting said one-way clutch to said cam for rotation of said cam.

8. The control system of claim 1 wherein said utilization means includes a warning circuit including a microswitch responsive to movement of said detecting means, and alarm means responsive to said microswitch for indicating exceeding of a predetermined ratio of speed of rotation of said first member compared to said second member.

9. The control system of claim 8 wherein is further provided a disabling circuit including a second microswitch in said disabling circuit responsive to said detecting means for actuation after actuation of the first mentioned microswitch, and means responsive to said second microswitch causing disabling of said vehicle.

10. The control system of claim 9 wherein said utilization means further comprises means to lessen the load on said vehicle in response to actuation of said first microswitch, and said means for disabling includes means for applying the brakes of said vehicle upon actuation of the second mentioned microswitch.

11. The control system of claim 9 wherein said microswitches are connected in series, said warning circuit including visual indicator means signifying proper operation of said vehicle when both said first and second microswitches are switched in series therewith, a second visual indicator means operative by switching said first microswitch for warning when the predetermined ratio is approached, and a third indicator operative by switching of said second microswitch to signify exceeding the predetermined ratio and consequent disabling of said vehicle.

12. The control system of claim 9 wherein is further provided a reset circuit including a reset switch to open said disabling circuit while maintaining said warning circuit closed, and reset circuit means for effecting driving of said second motor means independently of said sensing means to reset its respective detecting means, whereby normal operation of said vehicle can be resumed.

13. The control system of claim 1 wherein said sensing means comprises a magnet mounted on each of said tractive and idler means, cooperating proximity switches mounted adjacent said tractive and idler means, whereby actual physical interconnection susceptible to disabling by foreign matter is not required.

14. In an apparatus for sensing a difference in rotation between opposed rotary drive members having opposed shafts, the improvement comprising a housing rotatably mounted relative to said shafts, idler rotary disc means mounted on said housing having drive face means engaging the periphery of said drive members for rotation in response to said drive members, the axis of rotation of said disc means being transverse to the axis of said shafts, means for relatively shifting said housing with respect to said drive members to position at least one drive member at adjusted radial position along the face of said disc means, and means for detecting bodily rotation of said housing, whereby a preselected ratio of speeds of opposite rotation between said shafts as determined by the relative adjusted positions of said drive members on said disc means may be sensed.

15. The sensing apparatus of claim 14 wherein said shifting means comprises a circumferential slot extending around said housing, an adjustment lever having a yoke portion engaged in said slot, whereby adjustment may be made during operation of said apparatus.

16. The sensing apparatus of claim 14 wherein is further provided a one-way clutch connected to said housing in said detecting means, said one-way clutch allowing rotation of said housing in one direction without activation of said detecting means but causing activation of said detecting means if said housing rotates in the other direction.

17. In a control system for a vehicle having rotary tractive means for propelling said vehicle, and idler means rotating at the ground velocity of said vehicle, the improvement comprising magnet means mounted on each of said tractive and idler means, cooperating proximity switches mounted adjacent said tractive and idler means, for generating first and second signals indicative of the speed of said tractive and idler means, and means, coupled to said proximity switches, for generating an output signal indicative of the difference between the speed of said tractive and idler means.

* * * * *